United States Patent
Potter

[11] 3,993,375
[45] Nov. 23, 1976

[54] POWER DRIVEN ROTARY DATA STORAGE AND RETRIEVAL FILE

[76] Inventor: Frank Potter, 97 Birchwood Park Drive, Syosset, N.Y. 11791

[22] Filed: June 20, 1975

[21] Appl. No.: 588,815

[52] U.S. Cl. .............................. 312/197; 312/305; 211/1.5; 108/94
[51] Int. Cl.² ...................... A47B 53/00; A47F 3/08
[58] Field of Search .......... 312/197, 135, 202, 305; 108/20, 22, 94; 211/1.5

[56] References Cited
UNITED STATES PATENTS

| | | | |
|---|---|---|---|
| 1,704,953 | 3/1929 | Schockett et al. ................... | 211/1.5 |
| 1,790,338 | 1/1931 | Chartoff .............................. | 108/94 |
| 2,044,518 | 6/1936 | Thorstensen ........................ | 312/135 |
| 2,255,889 | 9/1941 | Kleinwachter ...................... | 312/135 |
| 2,332,845 | 10/1943 | Ducarpe .............................. | 211/1.5 |
| 2,971,651 | 2/1961 | Shoffner ............................. | 211/1.5 |
| 3,056,506 | 10/1962 | Fuller et al. ........................ | 312/196 |
| 3,245,545 | 4/1966 | Lortie ................................. | 211/1.5 |
| 3,672,740 | 6/1972 | Proulx ................................ | 312/197 |

FOREIGN PATENTS OR APPLICATIONS

| | | | |
|---|---|---|---|
| 1,072,298 | 9/1954 | France ................................ | 108/94 |
| 1,129,594 | 10/1968 | United Kingdom .................. | 108/94 |

*Primary Examiner*—Paul R. Gilliam
*Assistant Examiner*—Victor N. Sakran

[57] ABSTRACT

A data storage and retrieval file having a spoked wheel frame rotatably supported upon a post and carrying an annular data storage pan unit comprising a plurality of separable sections supported upon the spokes. A chain driven sprocket rotatably supported upon the post transmits its rotation through a floating friction slip plate clutch to the wheel frame, the load of the frame being supported upon a collar of the post, and pressure applying screws being carried by the frame are employed for adjusting the slipping point of the clutch plates.

6 Claims, 4 Drawing Figures

3,993,375

POWER DRIVEN ROTARY DATA STORAGE AND RETRIEVAL FILE

BACKGROUND OF THE INVENTION

This invention is directed to power driven rotary data storage and retrieval files of the large type used for carrying heavy articles, such as a large number of telephone directories, or the like; and it is directed to providing improvements in such structures.

Files of this general nature include a supporting post upon which a frame carrying a circular container or pan is mounted for relative rotation by means of a motorized drive acting through a friction slip-clutch connection with the frame. In using the apparatus, the operator energizes the motor causing the frame to rotate at a slow speed. As a desired particular section of the pan on the frame approaches the operator, he shuts off the power causing the frame to coast gradually to a stop, bringing the selected section before him.

The friction-slip clutch is necessitated by the momentum generated by the heavy load on the frame which continues the rotation of the frame briefly after the power has been cut off. However, a fault of the conventional friction clutch used in these structures lies in its structure whereby the load of the frame and its contents is borne by the clutch. This creates problems in start up, problems in wear of the clutch mechanism, and problems in obtaining a desirable slow coasting of the apparatus to a stop following power shut-off.

Another fault of known files lies in the structure of the container or pan. This has been found to be an integral circular unit which, because of its considerable weight and large size, approximately 8 to 10 feet in diameter, creates problems in transportation, in porting the unit through doorways, and in assembling it upon the frame.

The general objective of the present invention is to provide an improved rotary data storage and retrieval file of the large type which avoids the faults mentioned.

A feature of the invention lies in the nature of the friction-slip clutch which transmits the power drive to the frame. It is structured so that the load of the rotary wheel frame is borne by the supporting post and not by the clutch. An advantageous characteristic of the clutch lies in simple means for adjusting the pressure load for determining the friction engagement and slipping point of the clutch.

Some of the advantages derived from the improved clutch are reduced wear of its components; improved start-up, and desirable coasting and stopping after power shut-off.

Another feature lies in the structure of the data container or pan unit and in the associated wheel frame. The annular pan unit is not a single unit; but comprises a group, or plurality of separable segments or sections which, when assembled upon the frame, make up a full annular unit. Also, the frame is provided with spokes to support the several sections and to allow easy and quick assembly thereon. In the illustrated embodiment herein the pan unit is shown as comprising four separable segments of 90° each.

As is evident, a particular advantage of making the pan unit in sections is the ease of transportation, and assembly that results from such an arrangement.

DESCRIPTION OF PREFERRED EMBODIMENT

Figure 1:
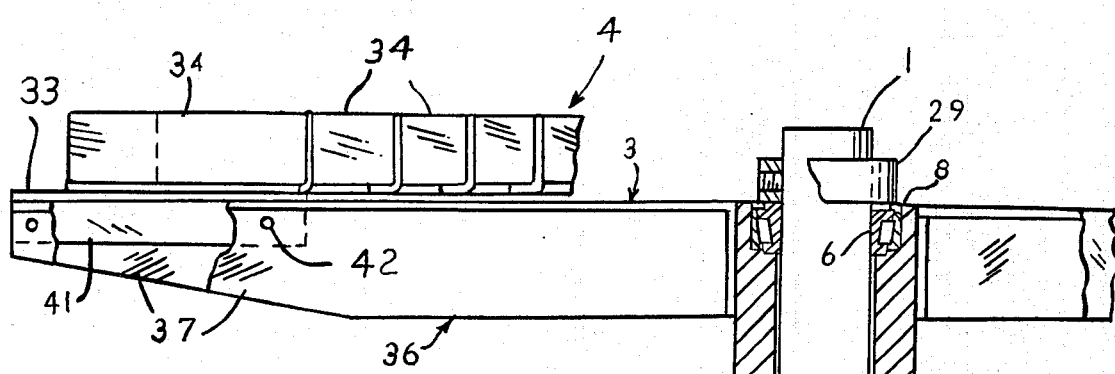
FIG. 1 is a vertical section through a motorized rotary data storage and retrieval file embodying the invention, some portions being cut away for better illustration.
Figure 2:
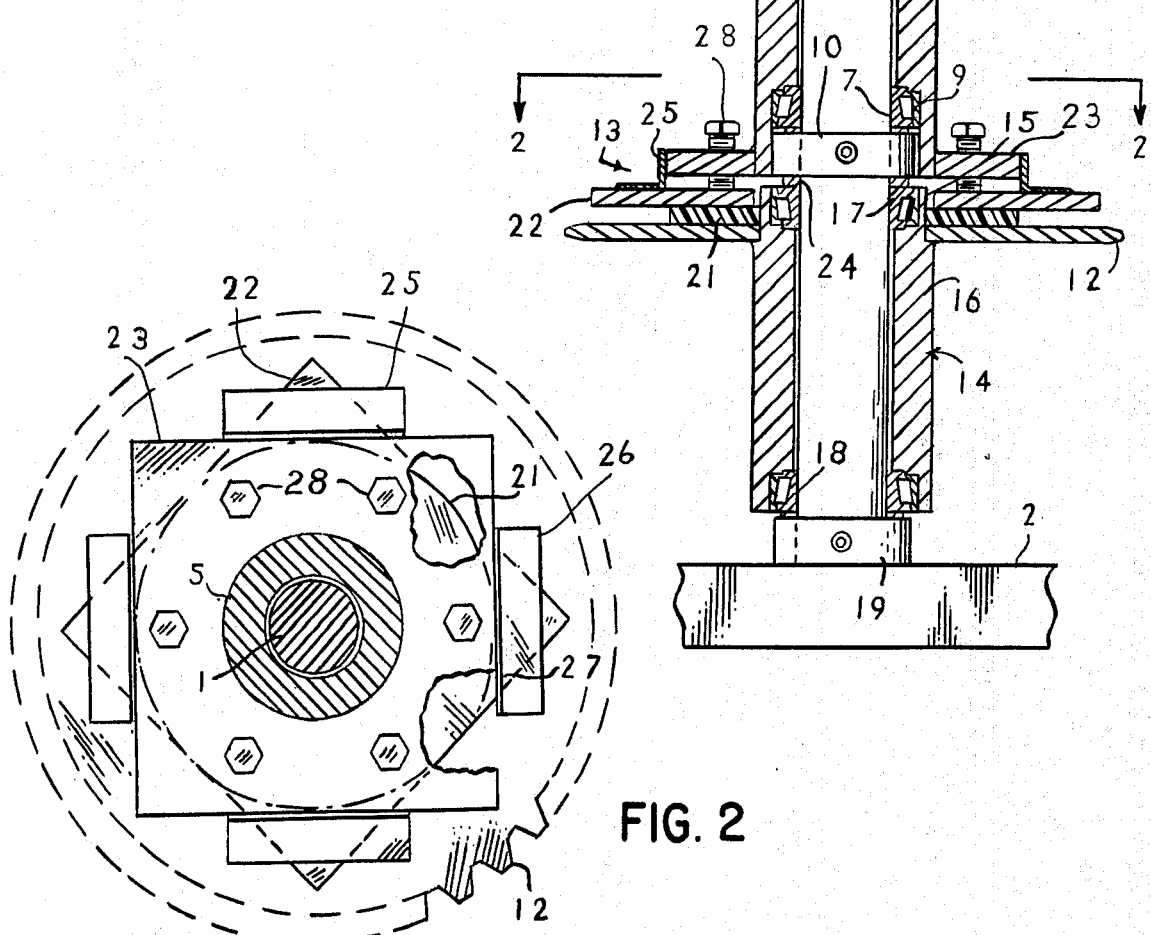
FIG. 2 is a section taken on line 2—2 of FIG. 1.

For a more detailed understanding of the invention it will now be described with reference to the accompanying drawing.

In the drawing is disclosed a motorized or power driven rotary data storage and retrieval file embodying the invention. The power drive is necessitated by the massiveness of its structure and the considerable weight of the data which it is designed to carry.

It includes a stationary cylindrical vertical supporting post 1 rigidly fixed at its bottom to a supporting floor base 2.

Mounted upon the upper portion of the post for relative rotation is a spoked wheel frame 3. An annular tray or pan unit 4, designed to contain the data to be stored and retrieved, is mounted upon the frame.

The frame has an axially depending tubular or open ended cylindrical hub 5, slidably received upon the post and supported thereon for relative rotation by means of a pair of bearings 6 and 7. The upper bearing 6 is seated in a recess 8 in the upper end of the hub; and the lower bearing 7 is seated in a recess 9 in the lower end of the hub.

The recess 9 is of sufficient axial depth to also accomodate therein a collar 10, which is rigidly fixed to the post by means of a set screw. The inner race of the lower bearing bears upon the collar, and the lower end of the hub is slidably disposed over the collar. By means of this construction the spoked frame 3 has rotation relative to the post and to the collar. The collar not only serves to support the weight of the spoked frame and its load, but also by its selected position upon the post determines the elevated position of the spoked frame and the pan unit thereon.

Rotation of the spoked frame about the post is powered by means of an electric motor, not shown, having a chain drive connection with a sprocket wheel 12. The latter is rotatably supported upon the lower portion of the post; and it is arranged to transmit the drive of the motor to the spoked frame through an intermediately located clutch mechanism 13.

The sprocket wheel has an axially extending hub 14 slidably received upon the post. A stub portion 15 of the hub rises above the surface of the sprocket wheel; and a considerably longer section 16 of the hub depends below the underface of the sprocket wheel. The sprocket wheel is supported upon the post for relative rotation by means of a pair of bearings 17 and 18, of which bearing 17 is seated in a recessed top end of the stub portion, and bearing 18 is seated in a recessed bottom end of the longer section of the hub.

The inner race of the lower bearing 18 is supported by a collar 19 fixed to the floor base 2, so that the load of the sprocket wheel is borne by the base.

The clutch mechanism 13, which is located between the spoked frame 3 and the sprocket wheel 12, is designed to provide an adjustable slip drive engagement between the sprocket wheel and the spoked frame. To this end, the clutch mechanism includes a floating annular driving clutch disc pad 21 which has been slidably received over the stub portion 15 of the sprocket wheel hub and lies upon the flat upper surface of the sprocket wheel. Pad 21 is formed of a tough plastics material having greasy or slippery qualities. Here, it is formed of a material having these qualities and known as teflon. While the pad has a floating condition, it could be bonded to the surface of the sprocket wheel.

Resting upon the upper flat surface of the clutch pad is a floating driven clutch plate 22 having an axial hole whereby the plate is loosely received over the upper end of the stub portion 15 of the sprocket wheel hub. The clutch plate is square in form. It has an interlocking driving engagement with a flange or base plate 23 offset radially from the bottom end of the hub 5 of the spoked frame 3. Plate 23 is also square in form and corresponds in dimension to the clutch plate 22. Plate 23 is disposed coaxially with and in parallel spaced relation to the clutch plate 22. The spacing between plates 22 and 23 is determined by an upper projecting end of the inner race of bearing 17, as at 24.

The driving engagement between the clutch plate 22 and plate 23 of the spoked frame is obtained by means of a group of right angle-irons 25 fixed to the surface of the clutch plate and engaging the sides of plate 23. In this respect, plate 23 is located above plate 22 with its corners displaced angularly 45° from the corners of plate 22; and a separate angle iron extends across each of the corners of plate 22. One arm 26 of each angle-iron is fixed to the surface of plate 22, and the other arm 27 rises upwardly in parallel contacting relation with a separate side of the upper plate 23. By means of this construction the lower plate is interlocked with the upper plate, whereby rotation imparted to the clutch plate is transmitted to the spoked frame.

A group of adjustable screws 28 threadedly engaged in plate 23 are threadedly extendible through the latter to engage the surface of the clutch plate 22 so as to pressurize the latter against the surface of the clutch pad 21 and thereby produce a frictional engagement of the clutch pad with both the sprocket wheel and the plate 22, whereby rotation of the sprocket wheel is transmissable to clutch plate 23 and as a consequence to the spoked frame. The screws are spaced circumferentially equally apart so as to enable application of a uniformly distributed pressure to the clutch plate. A collar 29 fixed, as by a set screw, to the upper end of the post abuts the inner race of the bearing 6. The collar serves to resist any tendency of the spoked frame to slide upwardly on the post when the screws 28 are pressured against the clutch plate 22.

The pressurized adjustment of the clutch plate relative to the clutch pad is such that when the power is shut off to stop the sprocket wheel, the momentum of the heavily loaded spoked wheel frame will cause the clutch plate to slip and override the clutch pad and slowly coast to a stop for retrieval by the operator of data material from the pan unit.

The pan unit or data holder 4 mounted atop the spoked frame may be adapted to hold data of various kinds. This may be in the form of files, magazines, books, or other. Here, the pan unit is designed for storage and retrievel of telephone directories. To give a good conception of the massiveness of the structure, the pan unit is approximately 8 to 10 feet in diameter. It can obviously accomodate a large number of telephone directories of various states or areas.

Figure 3:
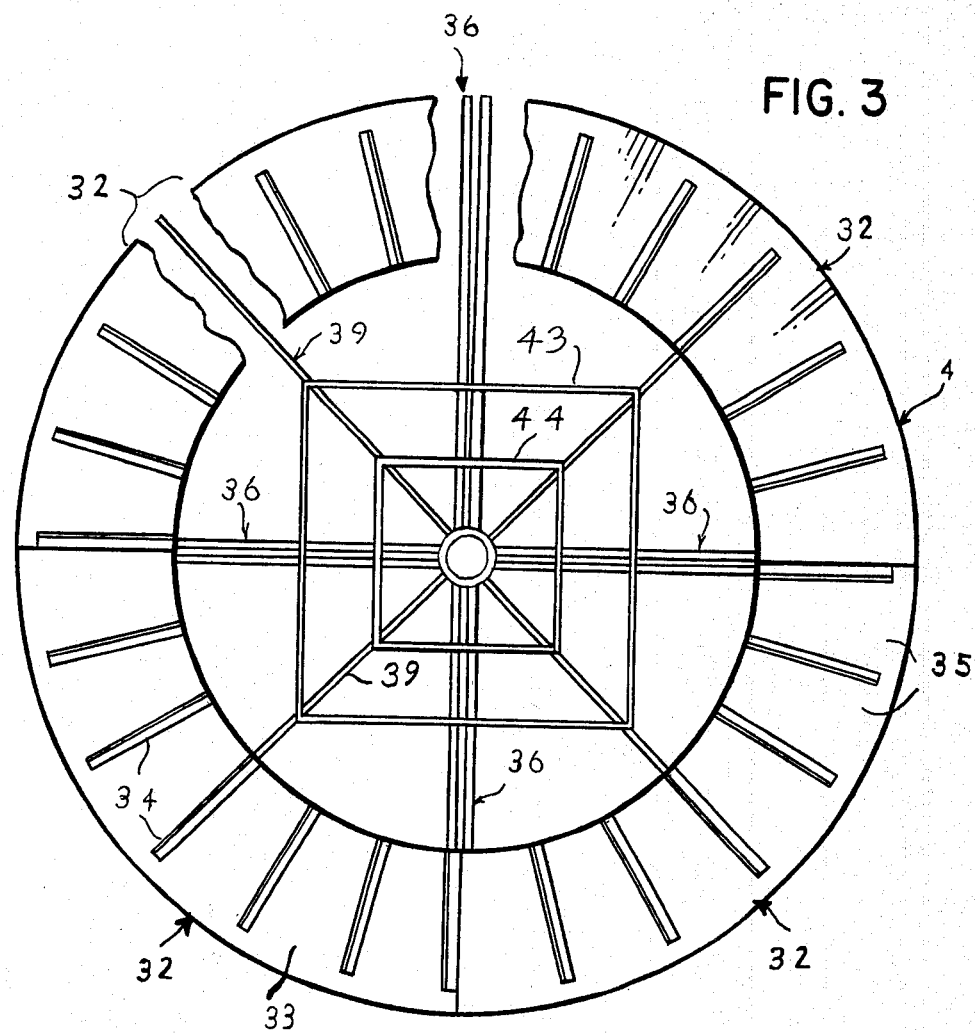
FIG. 3 is a plan view of the spoked wheel frame.

To facilitate porting, assembly and dismantling of the pan unit, the latter is here shown as being made up of four separable pan segments 32 (FIGS. 3, 4), each extending for 90°. And, the spoked frame is formed to permit easy assembly thereon, or removal of the pan segments therefrom.

Essentially, each pan segment 32 includes a radial extending annular floor or base 33, and a plurality of partition walls 34 extending radially across the surface of the base to define a succession of circumferentially spaced bins 35, each bin serving to accomodate a group of individual directories. It is understandable that each segment, according to the use intended, may be in the form of a container having end, side and bottom walls.

The individual pan segments 32 are caused to be assembled upon the spoked frame in end-to-end relationship to define a ring of pans or the complete annular pan unit. To enable this assembly in easy manner, the spoked frame comprises a group of main or primary spokes 36, and a group of secondary spokes 39.

Figure 4:
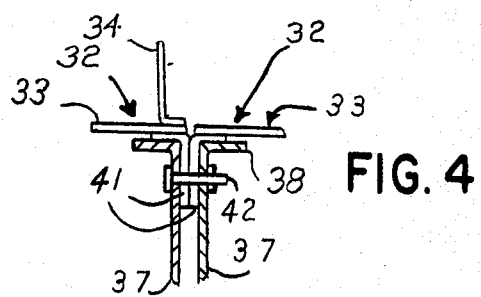
FIG. 4 is a detail showing a pair of adjacent pan segments having depending fins inserted between the beams of a primary spoke.

The primary spokes are four in number, spaced 90° apart about the post. Each is in effect a double spoke. It comprises two channel beams 37 welded at their inner ends to the post, and extending radially from the post with their flat back surfaces in close spaced relation to each other. The upper arms 38 of the channel beams extend away from each other in the same plane to define supporting shoulders for opposed ends of a pair of adjacent pan segments 32 (FIG. 4). Each pan segment has at each end of a depending fin or tongue 41 which is adapted to be inserted into the space between the beams.

The secondary spokes 39 are single channel beams welded at their inner ends to the post and extending radially therefrom. They serve to support the intermediate areas of the pan segments.

It can be seen, due to the radial arrangement of the spokes, that the pan segments when assembled thereon in ring array are confined to the assembled position, being unable to slide radially inwardly or outwardly of their position. However, to prevent possible undesirable lifting of the pan segments during use in the manipulation of phone directories relative to the pan segments, bolts 42 are extended through the beams 37 and the fins 41 to secure the pan segments against upward movement.

Fins at the undersides of the pan segments located intermediately of the end fins, may also be provided, which may be bolted to a back face of the secondary spokes.

Struts 43, 44 serve to interconnect and strengthen the several spokes to one another.

It is understandable that the number of primary and secondary spokes may be varied for needed support according to the number of segments comprising a pan unit.

It is also to be noted that in the event the motor drive to the sprocket wheel 12 should become disabled due to a power failure or other reason, the apparatus may nevertheless continue to be usefully operated by manual power. In this respect, it is only necessary to relax or free the pressured condition of the clutch element by loosening the adjusting screw element 28 sufficiently to enable the wheel frame 3 to be pushed about or rotated, as needed, by hand.

While an embodiment of the invention has been illustrated and described in detail, it is to be expressly understood that the invention is not limited thereto. Various changes of form, design or arrangement may be made in its parts without departing from the spirit and scope of the invention. It is my intention, therefore, to claim the invention not only as shown and described but also in all such forms, modifications or equivalents thereof as might reasonably be construed to be within the spirit of the invention when considering the specification, drawing, and appended claims.

What is claimed is:

1. A power driven rotary data storage and retrieval file comprising a vertical stationary post, a collar fixed upon the post intermediately of the ends of the post, a wheel frame having a depending tubular hub slidably received upon an upper portion of the post and seated upon the collar in bearing relationship for rotation relative to the collar and the post, the collar serving to bear the load of the wheel frame, a motor driven sprocket wheel having a depending hub slidably received upon a lower portion of the post below the collar for rotation relative to the collar and the post, the hub of the wheel frame and the hub of the sprocket wheel being restrained against axial movement relative to the post, the hub of the wheel frame having an integral plate flange extending radially about its lower end, and a slip plate friction clutch drivingly engaging the sprocket wheel with the flange whereby rotation of the sprocket wheel about the post is translated into rotation of the wheel frame about the post, the clutch comprising an annular friction disc pad coaxial with the post seated upon an upper flat face of the sprocket wheel and having rotation relative to the post, an upper clutch pressure plate resting upon the disc pad in coaxial relation to the post and having rotation relative to the post, means fixed upon the pressure plate having an interlocking driving engagement with the flange of the hub of the wheel frame, and screw elements threaded in the flange extending axially through the flange into abutment with an upper surface of the pressure plate, the screw elements pressurizing the pressure plate against the disc pad and as a consequence pressurizing the disc pad against the face of the sprocket wheel so that rotation of the latter is transmitted through the clutch to the wheel frame.

2. A power driven rotary data storage and retrieval file as in claim 1, wherein the flange and the pressure plate are square in form, and the means fixed upon the pressure plate having an interlocking driving engagement with the flange of the hub of the wheel frame comprises a group of angle members each having an arm fixed to the pressure plate and an upright arm abutting a separate side of the flange.

3. A power driven rotary data storage and retrieval file as in claim 2, wherein the pressure plate is displaced angularly 45° out of congruity relative to the flange.

4. A power driven rotary data storage and retrieval file as in claim 3, wherein each angle member extends at right angles to a perpendicular from the vertex of a separate corner of the pressure plate, and each side of the flange extends parallel to the upright arm of a separate one of the angle members.

5. A power driven rotary data storage and retrieval file as in claim 1, wherein the screws are arranged in the flange equally apart in a circular array that is coaxial with the post, and the screws are threadedly adjustable in the flange relative to the pressure plate so as to obtain a balanced pressure of the pressure plate upon the disc pad.

6. A power driven rotary data storage and retrieval file as in claim 1, wherein the wheel frame comprises a plurality of elongated spokes integral with the hub of the wheel frame and extending radially therefrom, each spoke comprising a pair of beams disposed circumferentially in closed spaced side relation to each other, an annular pan unit for containing storage material comprises a group of separate arcuate pan segments resting upon the spokes in end-to-end relationship, and a separate fin depending from the underside of opposite end areas of each segment is slidably inserted downwardly in the space between the beams of separate ones of the spokes, whereby each pan segment is restrained against radial and circumferential movement relative to the spokes.

* * * * *